United States Patent
Yokota et al.

(10) Patent No.: US 6,976,702 B2
(45) Date of Patent: Dec. 20, 2005

(54) SIDE AIRBAG

(75) Inventors: Masatoshi Yokota, Shiga (JP);
Kazuhiko Joujima, Shiga (JP);
Takeshi Kurimoto, Shiga (JP);
Akifumi Takedomi, Shiga (JP)

(73) Assignee: Takata Corporation, Tokyo (JP)

( * ) Notice: Subject to any disclaimer, the term of this patent is extended or adjusted under 35 U.S.C. 154(b) by 141 days.

(21) Appl. No.: 10/656,298

(22) Filed: Sep. 8, 2003

(65) Prior Publication Data

US 2004/0119269 A1 Jun. 24, 2004

(30) Foreign Application Priority Data

Dec. 19, 2002 (JP) .............. 2002-368484

(51) Int. Cl.[7] .................... B60R 21/24; B60R 21/22
(52) U.S. Cl. .................... 280/730.2; 280/729
(58) Field of Search .................... 280/730.2, 729, 280/739, 740, 742; B60R 21/24, 21/22

(56) References Cited

U.S. PATENT DOCUMENTS

| | | | |
|---|---|---|---|
| 5,464,250 A | 11/1995 | Sato | |
| 5,692,774 A | 12/1997 | Acker et al. | |
| 5,718,450 A * | 2/1998 | Hurford et al. | 280/730.2 |
| 5,791,685 A * | 8/1998 | Lachat et al. | 280/743.1 |
| 5,848,804 A | 12/1998 | White, Jr. et al. | |
| 5,906,391 A | 5/1999 | Weir et al. | |
| 6,032,977 A | 3/2000 | Reh et al. | |
| 6,062,594 A | 5/2000 | Asano et al. | |
| 6,142,517 A | 11/2000 | Nakamura et al. | |
| 6,270,113 B1 * | 8/2001 | Wipasuramonton et al. | 280/730.2 |
| 6,279,944 B1 * | 8/2001 | Wipasuramonton et al. | 280/730.2 |
| 6,349,964 B1 | 2/2002 | Acker et al. | |
| 6,827,368 B2 * | 12/2004 | Jang et al. | 280/729 |

FOREIGN PATENT DOCUMENTS

| | | |
|---|---|---|
| EP | 0 830 991 A1 * | 9/1997 |
| GB | 2 229 061 A * | 9/1996 |
| JP | 5-4553 | 1/1993 |
| JP | 5-131889 | 5/1993 |
| JP | 8-67228 | 3/1996 |
| JP | 9-39710 | 2/1997 |
| JP | 3038479 | 4/1997 |
| JP | 9-136595 | 5/1997 |
| JP | 10-100827 A * | 4/1998 |
| JP | 10-152011 A * | 6/1998 |
| JP | 10-175499 | 6/1998 |
| JP | 10-181498 | 7/1998 |
| JP | 10-273010 | 10/1998 |
| JP | 11-091493 A * | 4/1999 |
| JP | 2000-85515 | 3/2000 |
| JP | 2001-158320 | 6/2001 |
| JP | 2001-163162 | 6/2001 |
| JP | 2001-520604 | 10/2001 |
| JP | 2002-145003 | 5/2002 |

* cited by examiner

*Primary Examiner*—Ruth Ilan
(74) *Attorney, Agent, or Firm*—Manabu Kanesaka

(57) ABSTRACT

A side airbag is disposed at a side of a seat of a vehicle and inflated with gas supplied from a gas generator. The side airbag includes a sub-bag disposed in a lower section of the side airbag to be inflated with the gas supplied from the gas generator, and an upper section of the side airbag is inflated with the gas from the sub-bag.

7 Claims, 2 Drawing Sheets

Fig. 1
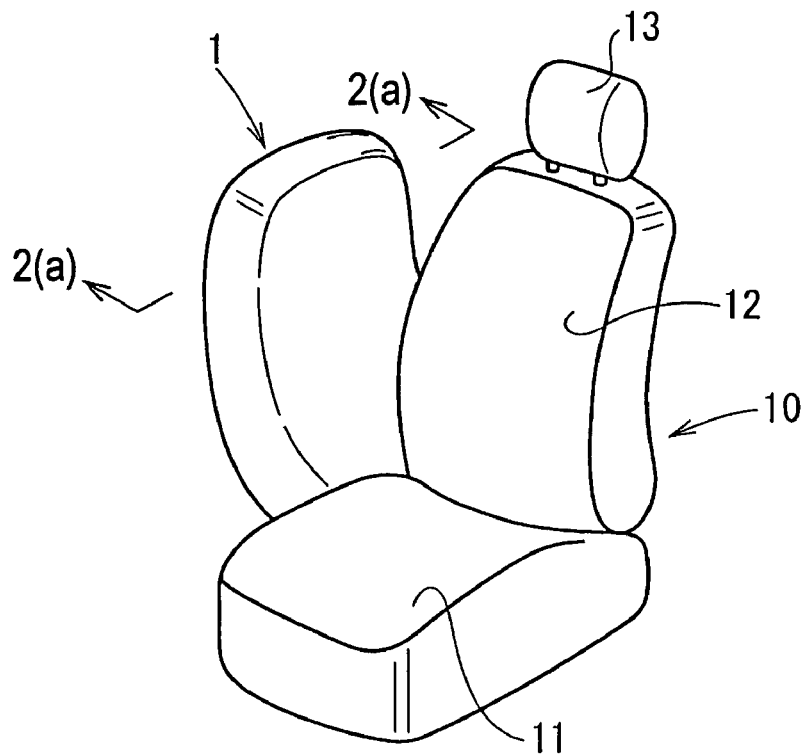
Fig. 2(a)
Fig. 2(b)
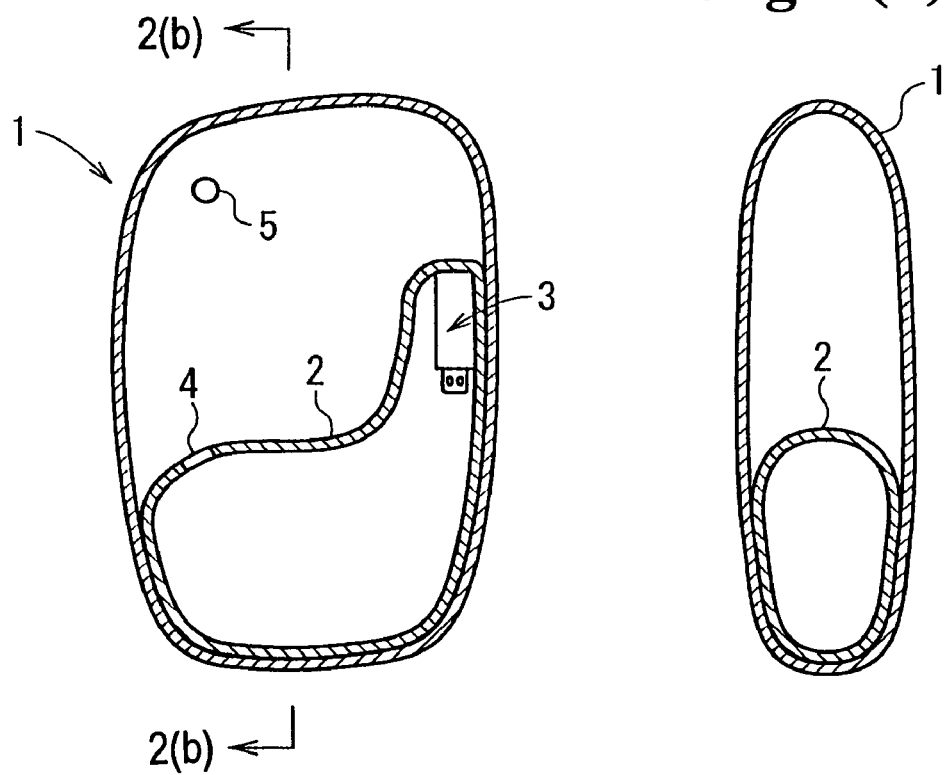

ional view of a side airbag taken along
SIDE AIRBAG

BACKGROUND OF THE INVENTION AND RELATED ART STATEMENT

The present invention relates to a side airbag for protecting an occupant sitting on a seat of a vehicle such as an automobile, and more specifically relates to a side airbag to be inflated at a side of a seat.

Conventionally, a side airbag is disposed at a side of a seat of an automobile and is inflated at the side of an occupant when an inflator (gas generator) is activated.

Japanese Patent Publication (Kokai) No. 2000-177527 has disclosed a side airbag having an upper section and a lower section divided by a seam (stitch line). An inflator supplies gas separately to the upper section and the lower section. It is arranged such that a pressure in the lower section becomes higher than that in the higher section for receiving a chest of the occupant softly when the side airbag is inflated.

According to the side airbag disclosed in Japanese Patent Publication (Kokai) No. 2000-177527, the upper section and the lower section of the side airbag are inflated substantially simultaneously.

An object of the present invention is to provide a side airbag in which a lower section is inflated with a higher pressure earlier than an upper section.

Further objects and advantages of the invention will be apparent from the following description of the invention.

SUMMARY OF THE INVENTION

According to the present invention, a side airbag is disposed at a side of a seat of a vehicle and inflated with gas supplied from a gas generator. The side airbag includes a sub-bag disposed in a lower section of the side airbag to be inflated with the gas supplied from the gas generator, and an upper section of the side airbag is inflated with gas from the sub-bag.

In the invention, when the gas generator is activated, the sub-bag is inflated first with a high pressure, and the lower section of the side airbag retaining the sub-bag is also inflated along with the sub-bag. Accordingly, the lower section of the side airbag is inflated with a high pressure, and pushes a lower portion of an occupant toward the center of the vehicle away from a door. Then, the upper section of the side airbag is inflated with a relatively low pressure with the gas from the sub-bag. The lower section of the side airbag is inflated first with a high pressure and pushing the occupant away from the door. Therefore, the upper section of the side airbag can be inflated relatively slowly.

According to the present invention, the sub-bag may be provided with an outlet through which the gas can flow out from the sub-bag into the side airbag. Accordingly, the gas can be supplied to the upper section of the side airbag from the sub-bag.

According to the present invention, the side airbag may be provided with closing means for blocking the outlet. It is arranged that the closing means opens the outlet when a gas pressure of the sub-bag reaches a predetermined pressure so as to allow the gas to flow out from the sub-bag. Accordingly, the sub-bag is inflated earlier with a sufficiently high pressure.

BRIEF DESCRIPTION OF THE DRAWINGS

FIG. 1, is a perspective view of an interior of an automobile including a side airbag according to the present invention;

FIG. 2(a) is a sectional view of a side airbag taken along line 2(a)—2(a) in FIG. 1, and FIG. 2(b) is a sectional view of the side airbag taken along line 2(b)—2(b) in FIG. 2(a)

DETAILED DESCRIPTION OF PREFERRED EMBODIMENTS

Figure 3:
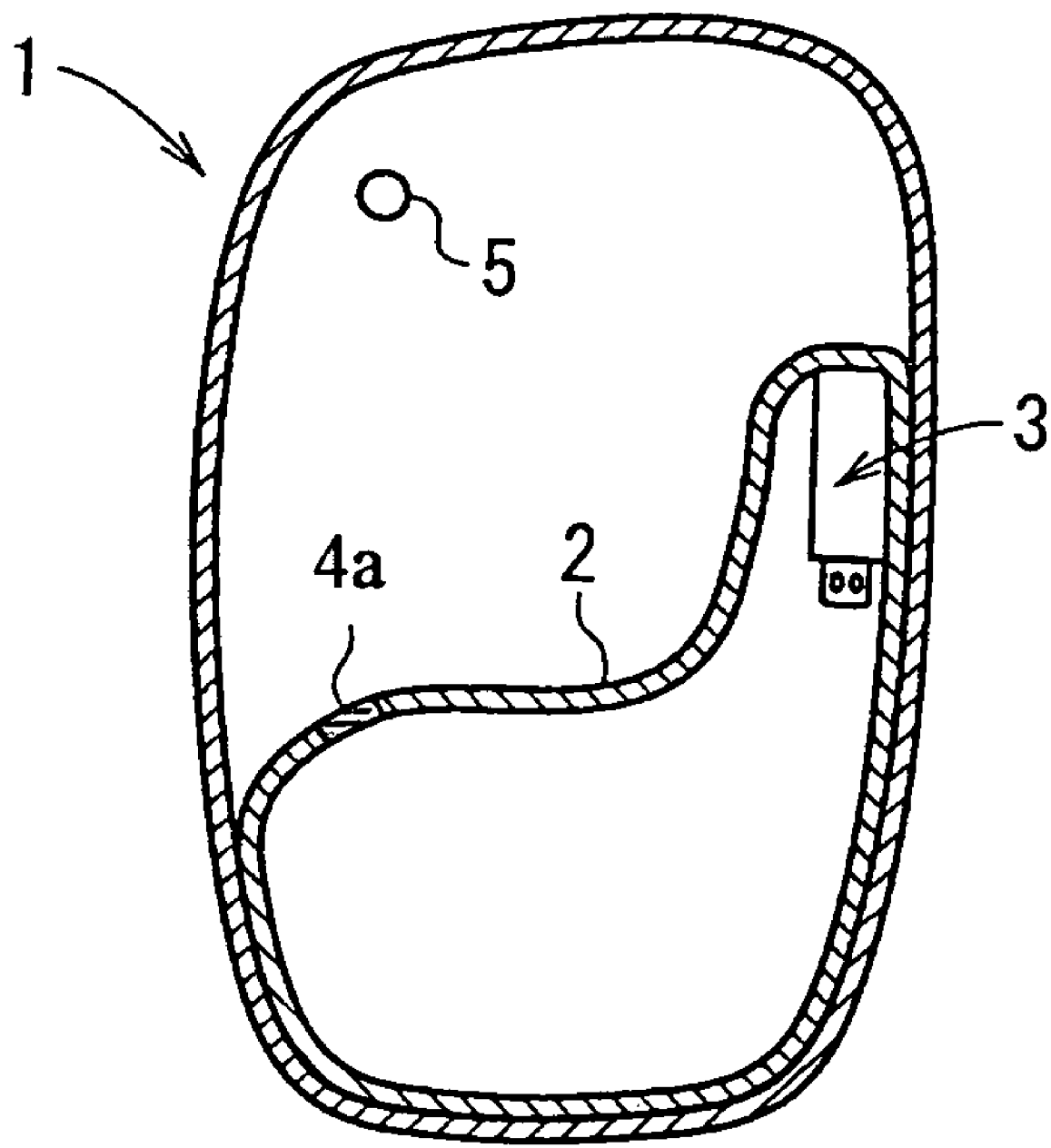
FIG. 3 is a sectional view similar to FIG. 2(a) for showing a tear seam.

Hereunder, embodiments of the invention will be explained with reference to the accompanying drawings. FIG. 1 is a view showing a side airbag in an inflated state according to an embodiment of the present invention, and FIGS. 2(a) and 2(b) are views showing a configuration of the side airbag.

A side airbag 1 has a bag shape, and may be formed of two panels joined at edges thereof by sewing, an adhesive, welding, etc. A sub-bag 2 is disposed in a lower section of the side airbag 1, and a gas generator 3 is disposed in the sub-bag 2. A top surface of the sub-bag 2 is provided with an opening 4 as an outlet for supplying the gas from the sub-bag 2 into an upper section of the side airbag 1.

The sub-bag 2 has a bag shape, and may be formed of two panels joined at edges thereof by sewing, an adhesive, welding, etc. A vent hole 5 is formed in one of the two panels adjacent to a door (which is away from an occupant) at an upper portion of the side airbag 1. When the two panels are sewn together, the edges of the two panels can be easily joined since the panels are flat. The vent hole 5 may also be omitted.

Although not shown in the figure, several bolts project from the gas generator 3, and the bolts extend through the sub-bag 2 and the side airbag 1 and are connected to a housing (not shown) of the side airbag apparatus. The side airbag 1 with the sub-bag 2 is retained in the housing in a folded state. Although the housing is preferably provided at a side of the seat, it may also be provided at an inner side of a door or a seat cushion.

In FIG. 1, a seat 10 of an automobile includes a seat cushion 11, a seat back 12, and a headrest 13. When the automobile with the side airbag collides on the side thereof or rolls over, the gas generator 3 is activated and ejects the gas to inflate the side airbag 1.

In such a case, the sub-bag 2 is inflated first with a high pressure, and then the upper section of the side airbag 1 is inflated when the gas flows in from the sub-bag 2 through the opening 4. It may be arranged such that before the occupant collides with the airbag, the sub-bag 2 is inflated at the maximum pressure about, for example, 300 kPa, and the upper section of the side airbag 1 is inflated at the maximum pressure about 100 kPa. However, the present invention is not limited to this setting.

As described above, the sub-bag 2 is inflated first with a high pressure in an early stage for receiving the hip of the occupant while pushing the occupant away from the door toward the center of the vehicle. During this time, the upper section of the side airbag 1 is inflated for receiving the chest of the occupant. When the occupant collides with the side airbag 1, the gas gradually flows out through the vent hole 5.

The opening 4 may be an unconnected portion of the two panels (for example, a portion that is not sewn) at the peripheral edge of the sub-bag 2. In such a case, a reinforcing portion may be formed at a portion close to the opening 4 so that the panels can be strongly joined together. Alternatively, the panels of the sub-bag 2 may be fixed at the entire periphery thereof, and an opening or a slit may be formed at a position away from the edges of the panels.

Although the opening 4 is always open in the above-described embodiment, it may be arranged such that the opening is normally closed by a tear seam (4a in FIG. 3) or an adhesive and opens when the gas pressure in the sub-bag 2 reaches a predetermined pressure to break the tear seam or the adhesive. In such a case, the sub-bag inflates in an extremely early stage with a higher pressure. In addition, the gas pressure in the sub-bag 2 can be controlled through adjusting strength of the tear seam or the adhesive.

In this embodiment, the entire body of the gas generator 3 is disposed inside the sub-bag 2. A most part of the gas generator may also be disposed at an outside of the side airbag, and only a gas-ejection hole of the gas generator may be disposed in the sub-bag 2. In addition, the entire body of the gas generator may be disposed at the outside of the side airbag, and the gas may be guided into the sub-bag 2 via a duct.

As described above, according to the side airbag of the present invention, the lower section is inflated earlier with a higher pressure than the upper section.

While the invention has been explained with reference to the specific embodiments of the invention, the explanation is illustrative and the invention is limited only by the appended claims.

What is claimed is:

1. A side airbag disposed in a vehicle to be inflated with gas from a gas generator, comprising:
   a main bag member having a lower section and an upper section, and
   a sub-bag disposed at the lower section of the main bag member to be connected to the gas generator and having an upwardly extending portion extending upwardly from one side of the sub-bag to be located in and surrounded by the upper section to allow the gas generator to be disposed therein so that the sub-bag is inflated with the gas from the gas generator and the upper section of the main bag is inflated with the gas from the sub-bag.

2. A side airbag according to claim 1, wherein said sub-bag has an opening so that the sub-bag is inflated first with the gas from the gas generator and then the upper section of the main bag is inflated when the gas from the sub-bag enters through the opening.

3. A side airbag according to claim 2, further comprising closing means disposed in the main bag for blocking the opening of the sub-bag, said closing means opening the opening when a gas pressure in the sub-bag reaches a predetermined pressure so as to allow the gas to flow out from the sub-bag.

4. A side airbag according to claim 2, wherein said opening is located at a side away from the upwardly extending portion and disposed below the upwardly extending portion.

5. A side airbag according to claim 4, wherein said upwardly extending portion is located at a side close to a back of a seat to allow the gas generator to be located vertically.

6. A side airbag according to claim 1, wherein said sub-bag is inflated at a maximum pressure of about 300 KPa and said upper section is inflated at a maximum pressure of about 100 KPa.

7. A side airbag apparatus comprising the side airbag according to claim 1, and a gas generator.

* * * * *